Feb. 5, 1924.  
W. K. WISE  
1,482,533  
COMBINED BUMPER SUPPORT, TIRE CARRIER SUPPORT, AND SPRING ATTACHING DEVICE  
Filed Jan. 29, 1923  
2 Sheets-Sheet 2
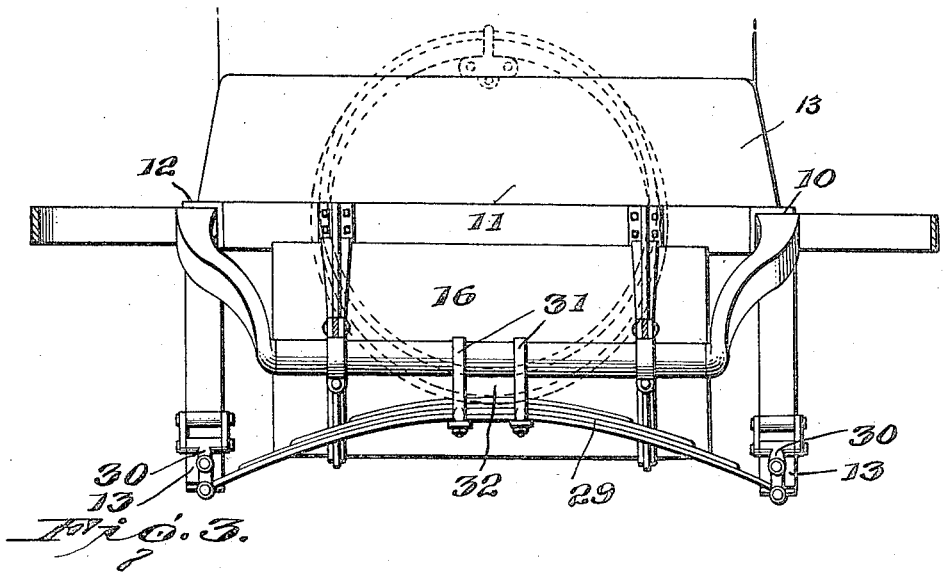
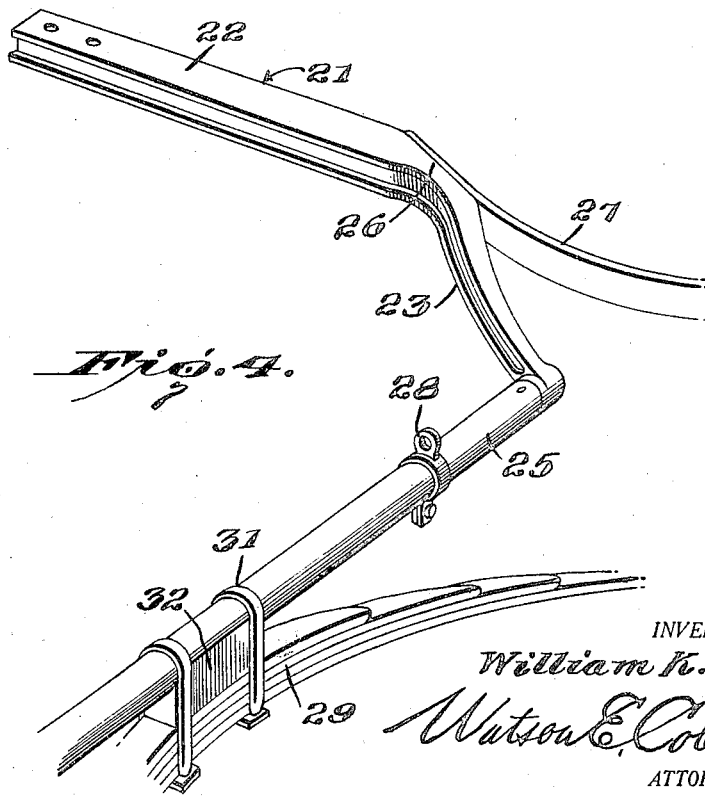
INVENTOR.  
William K. Wise,  
Watson E. Coleman  
ATTORNEY.

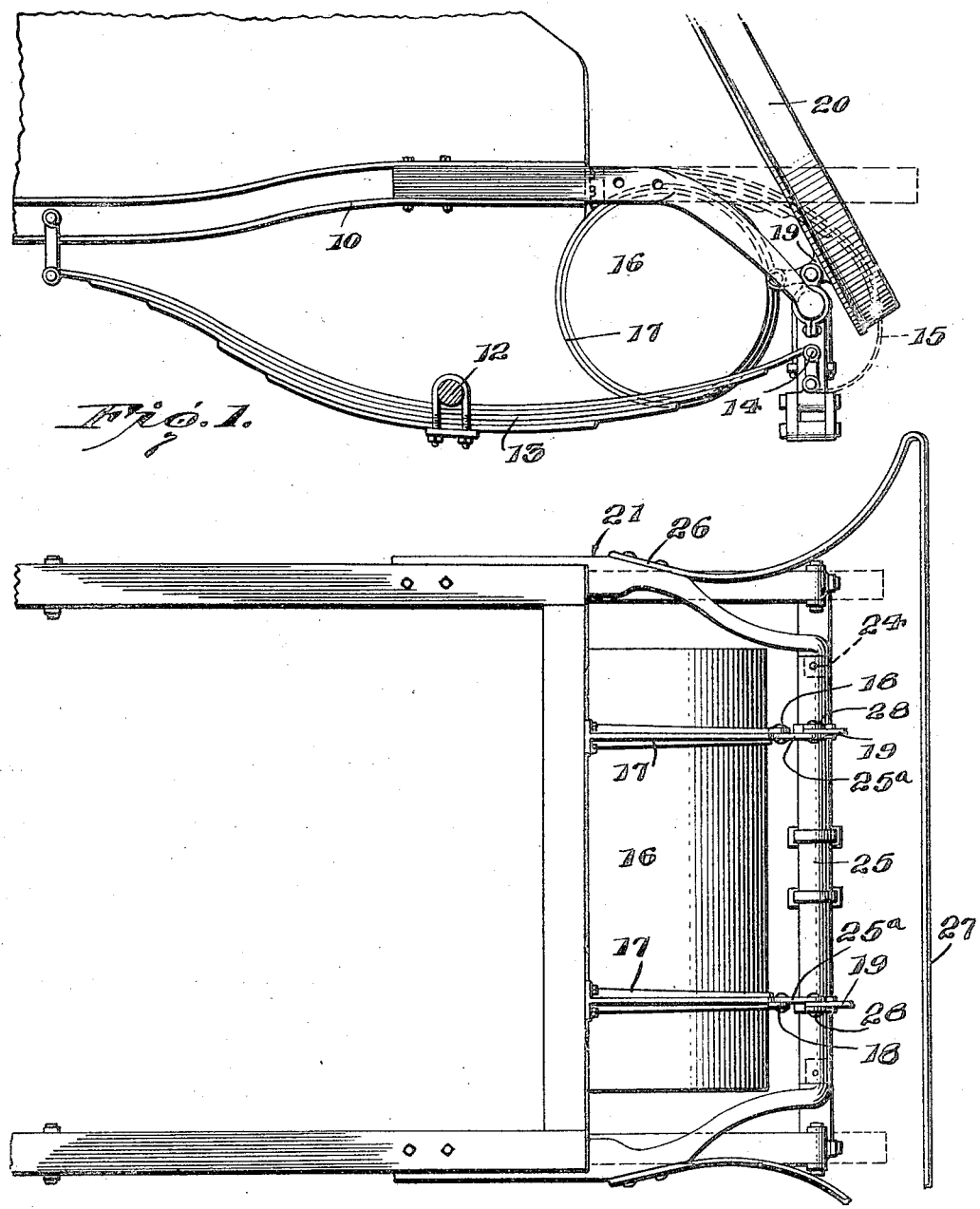

Patented Feb. 5, 1924.

1,482,533

UNITED STATES PATENT OFFICE.

WILLIAM K. WISE, OF TULSA, OKLAHOMA.

COMBINED BUMPER SUPPORT, TIRE-CARRIER SUPPORT, AND SPRING-ATTACHING DEVICE.

Application filed January 29, 1923. Serial No. 615,773.

*To all whom it may concern:*

Be it known that I, WILLIAM K. WISE, a citizen of the United States, residing at Tulsa, in the county of Tulsa and State of Oklahoma, have invented certain new and useful Improvements in Combined Bumper Support, Tire-Carrier Support, and Spring-Attaching Devices, of which the following is a specification, reference being had to the accompanying drawings.

This invention relates to improvements in combined bumper support, tire carrier support and spring attaching device.

An important object of the invention is to provide a device of this character which in addition to performing the functions above set forth likewise serves as a guard rigidly protecting the fuel tank of the vehicle against damage.

A further object of the invention is to provide a unitary construction performing all of these functions.

As is well known to those familiar with the art, in certain types of vehicles the chassis frame is supported from the rear axle by a spring secured centrally to the rear axle, having the forward end attached to the chassis frame and its rear end projecting beyond the rear end of the chassis frame. From the rear end of the chassis frame at the sides thereof extend three quarter elliptic springs, the rear ends of which are connected with the rear ends of the first named springs. In this type of vehicle the fuel tank is usually located at the rear end of the chassis and has its upper surface so closely engaged with the rear frame member thereof, being attached to this frame member, that it interferes with the attachment of any accessories to such rear frame member. Accordingly in order to support such accessories as a tire carrier, the tank is provided, as a portion of its attaching means, with bands surrounding the same having ears to which the securing clips of the tire carrier are secured. This form of construction has numerous disadvantages, the chief of which are that the tank projecting rearwardly of the main frame and being unprotected is subjected often to a severe blow during a collision and is dented or otherwise deformed or possibly caused to leak; the springs projecting rearwardly from the frame are so positioned that in event of collision, as in backing the car or when the vehicle is struck by a car approaching from the back, these springs are broken or damaged, the weight of such accessories as the tire carrier being applied to the tank and subjected to vibration during passage of the vehicle over the road tend to loosen the tank upon its fastening and often cause a leakage in the tank or the connections thereof, in addition to the unpleasant rattling noise accompanying any loose part upon a vehicle of this character. Furthermore, with devices of this character, there is no point upon the rear of the vehicle to which a bumper may be attached to protect the springs and tank with their associated elements except the springs themselves and the attachment of a bumper to the springs is unsatisfactory for the reasons that it interferes with the proper operation of the spring and is liable to cause breakage thereof. Accordingly, an important object of the invention is to provide a simple device which may be readily applied to the vehicle and which by its application eliminates such faults.

These and other objects I attain by the construction and arrangement shown in the accompanying drawings wherein for the purpose of illustration is shown a preferred embodiment of my invention and wherein like reference characters designate like parts throughout.

In the drawings:—

Figure 1 is a fragmentary sectional view partially diagrammatic showing apparatus constructed in accordance with my invention;

Figure 2 is a plan view thereof, the tire carrier being removed;

Figure 3 is a rear elevation thereof with the tire carrier removed; and

Figure 4 is a fragmentary perspective of the attachment removed.

Referring now more particularly to the drawings, the numeral 10 indicates the longitudinal members of the chassis frame, 11 the rear end member thereof and 12 the axle to which the springs 13 are secured centrally. The forward ends of the springs are secured to the longitudinal members 10 of the frame and the rear ends 14 of these springs project beyond the rear end of the chassis frame and are in the normal construction of the vehicle attached to the rear ends of one-quarter elliptic springs 15 which are secured to the longitudinal members 10 of the chassis frame by housing the forward ends thereof therein. This latter structure is not herein disclosed but is well known to those familiar with the art. The numeral 16 designates a fuel tank having bands 17 surrounding the same by means of which the tank is secured to the rear frame member 11 of the chassis frame, these bands including attaching ears 18 adapted for attachment to the lower attaching clips 19 of the tire carrier 20. The upper attaching clip of the tire carrier 20 is secured directly to the body B of the vehicle.

In accordance with my invention I remove the one-quarter elliptic springs 15 and substitute therefor rigid attaching arms 21, which arms include a straight portion of considerable length, indicated at 22, which is adapted to be received in the housing and attached to the longitudinally extending frame members 10. Beyond the rear ends of the frame members the arms 21 converge inwardly, as indicated at 23, and at the same time are curved downwardly so that their terminal portions are arranged approximately upon a level with the horizontal center of the tank 16 and inwardly of or substantially coincident with the ends thereof. Each arm 21 is provided upon its inner face at the rear end thereof with a lug 24 extending toward the other arm 21, which lugs receive the ends of a tubular support and brace member 25, the ends of which are rigidly secured to these lugs. Attention is directed to the fact that the construction recited moves the rear ends of the arms 21 and accordingly the ends of the brace member 25 inwardly a sufficient distance to permit the same to pass vertically between the adjacent side faces of the spring members 13.

The arms 21 are provided upon their outer faces with flattened portions 26 adapted for the reception of the attaching ends of a bumper 27, these flattened portions preferably converging rearwardly so as to conform to the shaping of the attaching ends of the bumper as usually provided. With the bumper secured in position as shown in Figure 2, the bumper itself provides a yielding check and the bar or brace 25 forms a positive stop positively limiting the movement of the oncoming vehicle toward the rear end of the vehicle to which the device is attached. This stop is arranged below the path of movement of the bumper so that the normal operation thereof is in no manner interfered with, the brace 25 effectually preventing any part of an oncoming vehicle which may project forwardly of that part engaged by the bumper from coming into engagement with the tank, or as will hereinafter appear, with the ends of the vehicle springs 13.

Secured to the bar or brace 25 at opposite sides of the center thereof are upwardly extending attaching ears 28 by means of which the lower attaching arms 19 of the tire carrier 20 and attaching ears 18 of the band 17 may be attached to the brace 25, thus relieving the tank 16 of the weight of the tire carrier and a tire in position thereon when the same is employed. The upper securing element of the tire carrier will remain attached to the body in the usual manner. Links 25$^a$ are rigidly engaged at one end with the ears of the band 17 and at their opposite ends to the attaching ears 28 of the brace 25. Secured centrally of its length to the center of the transversely extending brace 25 is an inverted semi-elliptical leaf spring 29, the ends of which extend below the outer rear ends of the springs 13 and are shackled thereto by universal shackles 30. The attachment of the spring 29 to the bar 25 is through the medium of attaching clips 31 and an adapting plate 32 of any desired construction.

It will be seen that by the provision of the attachment consisting of the arms 21 and transversely extending brace 25 of less length than the distance between the longitudinally extending springs of the vehicle and the spring 29, a number of important functions are accomplished. The supporting base of the chassis body is lengthened, the strain of the tire carrier is removed from the tank and the supports of the tank thereof relieved of this weight, the tank is additionally supported, the springs and tank protected, and means are provided whereby a bumper may be attached to the rear of the vehicle. It will furthermore be seen that the specific construction of the various parts of the device as hereinbefore set forth is capable of some change and modification without materially departing from the spirit of my invention and I accordingly do not limit myself to such specific structure except as hereinafter claimed.

I claim:

1. In combination with a chassis having a frame including a transversely extending rear end member and a tank secured thereto and projecting rearwardly therefrom, an attachment therefor comprising a pair of arms adapted to be rigidly secured to the frame at opposite sides thereof and having their ends extending rearwardly and downwardly therefrom, and a brace bar rigidly connecting the rear ends of said arms and disposed rearwardly of the tank in alignment therewith.

2. In combination with a chassis having a frame including a transversely extending rear end member and a tank secured thereto and projecting rearwardly therefrom, an attachment therefor comprising a pair of arms adapted to be rigidly secured to the frame at opposite sides thereof and having their ends extending rearwardly and downwardly therefrom, and a brace bar rigidly connecting the rear ends of said arms and disposed rearwardly of the tank in alignment therewith, said arms being provided with seats adapted for the reception of the attaching ends of a bumper.

3. In combination with a chassis having a frame including a transversely extending rear end member, a tank associated with the rear end member and projecting rearwardly therefrom, means for securing the tank to the rear end member including bands encircling the tank and secured to the rear end member and having attaching ears formed thereon for the reception of the lower attaching arms of a tire carrier, an attachment therefor including a pair of arms adapted to be rigidly secured to the frame at opposite sides of the rear end thereof and extending rearwardly and downwardly from such rear end, a brace connecting the rear ends of said arms and aligned with the tank and disposed rearwardly thereof, and attaching ears for the reception of the attaching arms of a tire carrier carried by said brace.

4. In combination with a chassis having a frame including a transversely extending rear end member, a tank associated with the rear end member and projecting rearwardly therefrom, means for securing the tank to the rear end member including bands encircling the tank and secured to the rear end member and having attaching ears formed thereon for the reception of supports for the lower attaching arms of a tire carrier, an attachment therefor including a pair of arms adapted to be rigidly secured to the frame at opposite sides of the rear end thereof and extending rearwardly and downwardly from such rear end, a brace connecting the rear ends of said arms and aligned with the tank and disposed rearwardly thereof, and attaching ears for the reception of the attaching arms of a tire carrier carried by said brace, the outer faces of said arms being provided with attaching seats adapted for the reception of the attaching ends of a bumper.

5. In combination with a chassis having a frame, an axle extending transversely of the frame adjacent one end thereof, longitudinally extending springs secured intermediate their ends to the axle and at one end to the frame, the other ends of the springs extending beyond said end of the frame, other springs secured at one end to the chassis and at their other end to the last named ends of the first named springs, an attachment therefor including a pair of arms adapted to replace the last named springs and having their end portions extending rearwardly from the frame and inclining inwardly and downwardly, a brace bar attached to the rear ends of said arms and of less length than the distance between adjacent faces of the first named springs, an inverted semi-elliptical spring secured centrally to the center of said bar and extending transversely of the frame, the free ends of said semi-elliptical spring being adapted for engagement with the adjacent last named ends of the first named springs.

6. In combination with a chassis having a frame, an axle extending transversely of the frame adjacent one end thereof, longitudinally extending springs secured intermediate their ends to the axle and at one end to the frame, the other ends of the springs extending beyond said end of the frame, other springs secured at one end to the chassis and at their other end to the last named ends of the first named springs, an attachment therefor including a pair of arms adapted to replace the last named springs and having their end portions extending rearwardly from the frame and inclining inwardly and downwardly, a brace bar attached to the rear ends of said arms and of less length than the distance between adjacent faces of the first named springs, an inverted semi-elliptical spring secured centrally to the center of said bar and extending transversely of the frame, the free ends of the semi-elliptical spring extending beneath the last named ends of the first named springs and universal shackles connecting the free ends of the semi-elliptical spring and such last named ends.

7. In combination with a chassis having a frame including a transversely extending rear end member and side members, an axle extending transversely beneath the frame adjacent such rear end member, longitudinally extending springs secured intermediate their ends to the axle and at one end to the corresponding longitudinally extending member of the frame, the other ends of the longitudinally extending springs extending beyond the rear end of the frame, other springs having one end housed in the longitudinally extending members and secured thereto and their rear ends connected with the rear ends of the longitudinally extending springs, and a tank secured to said transversely extending member and projecting rearwardly therebeyond, an attachment therefor comprising a pair of arms adapted to replace the last named springs and having attaching portions housed in said longitudinally extending members of the frame in lieu of the first named portions of the last named springs, the rear ends of said arms inclining inwardly and downwardly and being connected at their rearward extremities by a brace member, said brace member aligning with and being disposed immediately rearwardly of said tank, and an inverted semi-elliptical spring secured at its central portion to the center of said bar and extending transversely with relation to the frame, the ends of said semi-elliptical spring extending in proximity to and being attached to the rear ends of said longitudinally extending springs.

8. In combination with a chassis having a frame including a transversely extending rear end member and side members, an axle extending transversely beneath the frame adjacent such rear end member, longitudinally extending springs secured intermediate their ends to the axle and at one end to the corresponding longitudinally extending member of the frame, the other ends of the longitudinally extending springs extending beyond the rear end of the frame, other springs having one end housed in the longitudinally extending members and secured thereto and their rear ends connected with the rear ends of the longitudinally extending springs, a tank secured to said transversely extending member and projecting rearwardly therebeyond, an attachment therefor comprising a pair of arms adapted to replace the last named springs and having attaching portions housed in said longitudinally extending members of the frame in lieu of the first named portions of the last named springs, the rear ends of said arms inclining inwardly and downwardly and being connected at their rearward extremities by a brace member, said brace member aligning with and being disposed immediately rearwardly of said tank, and an inverted semi-elliptical spring secured at its central portion to the center of said brace member and extending transversely with relation to the frame, the ends of said semi-elliptical spring extending in proximity to and being attached to the rear ends of said longitudinally extending springs, said arms being provided upon the outer faces thereof with attaching seats adapted for the reception of attaching portions of a bumper.

9. In combination with a chassis having a frame including a transversely extending rear end member, a tank associated with the rear end member and projecting rearwardly therefrom, means for securing the tank to the rear end member including bands encircling the tank and secured to the rear end member and having attaching ears formed thereon for the reception of supports for the lower attaching arms of a tire carrier, an attachment therefor including a pair of arms adapted to be rigidly secured to the frame at opposite sides of the rear end thereof and extending rearwardly and downwardly from such rear end, a brace connecting the rear ends of said arms and aligned with the tank and disposed rearwardly thereof, and attaching ears for the reception of the attaching arms of a tire carrier carried by said brace and secured to said attaching arms and to the attaching ears of said bands.

10. In combination with a chassis having a frame including a transversely extending rear end member, a tank associated with the rear end member and projecting rearwardly therefrom, means for securing the tank to the rear end member including bands encircling the tank and secured to the rear end member and having attaching ears formed thereon for the reception of supports for the lower attaching arms of a tire carrier, an attachment therefor including a pair of arms adapted to be rigidly secured to the frame at opposite sides of the rear end thereof and extending rearwardly and downwardly from such rear end, a brace connecting the rear ends of said arms and aligned with the tank and disposed rearwardly thereof, and attaching ears for the reception of the attaching arms of a tire carrier carried by said brace and secured to said attaching arms, and links rigidly secured at one end to the attaching ears of said brace and at their opposite ends to the attaching ears of said bands.

In testimony whereof I hereunto affix my signature.

WILLIAM K. WISE.